United States Patent
Ghadaksaz

(10) Patent No.: US 7,986,647 B2
(45) Date of Patent: Jul. 26, 2011

(54) PORTABLE WIRELESS REPEATER SYSTEM FOR INDOOR WIRELESS COVERAGE ENHANCEMENT OF RESIDENTIAL, SMALL OFFICE, AND VEHICULAR APPLICATIONS

(75) Inventor: Michael M. Ghadaksaz, Inverness, IL (US)

(73) Assignee: iCover Wireless, Inc., Schaumburg, IL (US)

( * ) Notice: Subject to any disclaimer, the term of this patent is extended or adjusted under 35 U.S.C. 154(b) by 909 days.

(21) Appl. No.: 11/906,288

(22) Filed: Sep. 29, 2007

(65) Prior Publication Data

US 2009/0086655 A1  Apr. 2, 2009

(51) Int. Cl.
*H04B 3/36* (2006.01)
(52) U.S. Cl. ........... 370/293; 370/279; 455/7; 455/90.3
(58) Field of Classification Search ............. 455/7, 11.1, 455/13.1, 575.1, 90.3; 370/279, 280, 293
See application file for complete search history.

(56) References Cited

U.S. PATENT DOCUMENTS

| | | | | |
|---|---|---|---|---|
| 2002/0163984 | A1* | 11/2002 | Katzman et al. | 375/355 |
| 2003/0201941 | A1* | 10/2003 | Aikawa et al. | 343/700 MS |
| 2005/0186932 | A1* | 8/2005 | Kurimoto et al. | 455/284 |
| 2006/0205342 | A1* | 9/2006 | McKay et al. | 455/11.1 |
| 2007/0155314 | A1* | 7/2007 | Mohebbi | 455/11.1 |

* cited by examiner

*Primary Examiner* — Nguyen Vo
*Assistant Examiner* — Golam Sorowar
(74) *Attorney, Agent, or Firm* — Patents and Licensing LLC; Daniel W Juffernbruch

(57) ABSTRACT

A portable wireless signal repeater module having embedded integrated patch antennas is installed on a window of a house or office or the interior surface of a vehicle's windshield. The module has two sets of embedded patch antennas, which, when mounted on a window, one set faces outdoors and another face indoors. Signals from nearby cellular service provider's transmitters are received by embedded patch antennas facing outdoors, filtered, amplified, and through a duplexer, passed on to the embedded patch antennas facing indoors for propagation within the indoor environment. Signals from handsets indoors are received by embedded patch antennas of the repeater module facing indoors, filtered, amplified, and through a duplexer, passed on to the embedded antennas facing outdoors for propagation toward nearby cellular service provider's receiver.

17 Claims, 10 Drawing Sheets

PORTABLE WIRELESS REPEATER SYSTEM FOR INDOOR WIRELESS COVERAGE ENHANCEMENT OF RESIDENTIAL, SMALL OFFICE, AND VEHICULAR APPLICATIONS

FIELD OF THE INVENTION

The present invention relates to the field of mobile wireless communications. More specifically, the present invention relates to a system and method for wireless communications, which improve indoor coverage for small areas.

BACKGROUND

Various advances in semiconductor manufacturing technology, digital systems architecture, and software development have made possible the widespread acceptance and deployment of wireless communication systems such cellular telephone networks, sometimes referred to as mobile telephone networks.

Although there has been significant build out of cellular telephone network infrastructure, there still exist many areas of poor or unsatisfactory signal coverage. That is, there are areas where signals from a base transceiver station do not reach mobile phones, or where signals from mobile phones do not reach the base transceiver station. Often these areas of poor or unsatisfactory signal coverage exist within houses, small business offices, or automobiles.

Products, such as signal repeaters, have been introduced to extend the coverage areas in which a cellular telephone network can operate. Unfortunately, these signal repeaters typically include features which makes them unable to be portable, such as cables, power cords, multiple boxes, relatively large antennas, and so on.

What is needed are methods and apparatus for a low-cost, portable, wireless repeater module for indoor wireless coverage enhancement of residential, small office, and vehicular spaces.

SUMMARY OF THE INVENTION

Briefly, a portable wireless signal repeater module having embedded integrated patch antennas is installed on a window of a house or office or the interior surface of a vehicle's windshield. The module has two sets of embedded patch antennas, which, when mounted on a window, one set faces outdoors and another face indoors. Signals from nearby cellular service provider's transmitters are received by embedded patch antennas facing outdoors, filtered, amplified, and through a duplexer, passed on to the embedded patch antennas facing indoors for propagation within the indoor environment. Signals from handsets indoors are received by embedded patch antennas of the repeater module facing indoors, filtered, amplified, and through a duplexer, passed on to the embedded antennas facing outdoors for propagation toward nearby cellular service provider's receiver.

In a further aspect of the present invention, a dual-band repeater module includes a pair of embedded outdoor-facing patch antennas and a pair of indoor-facing patch antennas. Each of the pair of outdoor-facing patch antennas is coupled through respective duplexers, amplifiers and filters to a forward-path dual-band directional coupler. The output of the forward-path dual-band directional coupler is processed by a diplexer to produce two different frequency band outputs, which correspond to signals received respectively from each of the pair of embedded outdoor-facing patch antennas. These forward-path diplexer output signals are further processed through amplifiers, isolators, and duplexers to be coupled with respective ones of the pair of embedded indoor-facing patch antennas for transmission to an area where signal coverage is to be improved. Similarly, each of the pair of indoor-facing patch antennas is coupled through respective duplexer, amplifiers and filters to a reverse-path dual-band directional coupler. The output of the reverse-path dual-band directional coupler is processed by a diplexer to produce two different frequency band outputs, which correspond to signals received respectively from each of the pair of embedded indoor-facing patch antennas. These reverse-path diplexer output signals are further processed through amplifiers, isolators, and duplexers to be coupled with respective ones of the pair of embedded outdoor-facing patch antennas for transmission, typically to a cellular or mobile phone service provider.

In a still further aspect of the present invention, the outdoor-facing patch antennas are disposed on a first substrate, the amplifier, filter and coupler components are disposed on a second board, the indoor-facing patch antennas are disposed on a third substrate, and the first, second, and third substrates are disposed within a housing.

DETAILED DESCRIPTION

Figure 1:
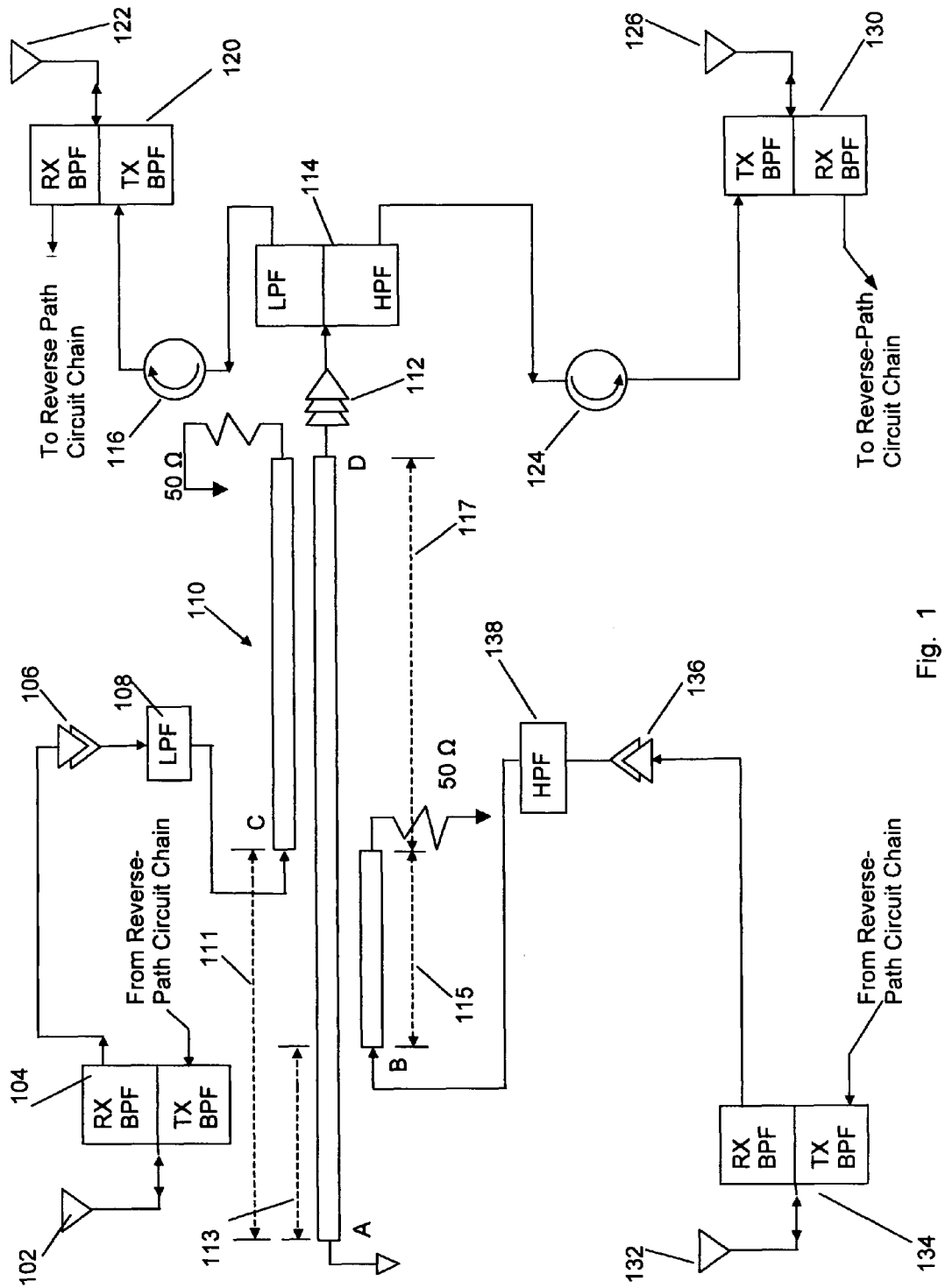
FIG. 1 is a schematic block diagram of the forward path of a repeater module for North American dual frequency bands in accordance with the present invention.

Generally, a dual-band repeater module in accordance with the present invention includes a pair of embedded outdoor-facing patch antennas and a pair of indoor-facing patch antennas. Each of the pair of outdoor-facing patch antennas is coupled through respective duplexers, amplifiers and filters to a forward-path dual-band directional coupler. The output of the forward-path dual-band directional coupler is processed by a diplexer to produce two different frequency band outputs, which correspond to signals received respectively from each of the pair of embedded outdoor-facing patch antennas. These forward-path diplexer output signals are further processed through amplifiers, isolators, and duplexers to be coupled with respective ones of the pair of embedded indoor-facing patch antennas for transmission to an area where signal coverage is to be improved. Similarly, each of the pair of indoor-facing patch antennas is coupled through respective duplexer, amplifiers and filters to a reverse-path dual-band directional coupler. The output of the reverse-path dual-band directional coupler is processed by a diplexer to produce two different frequency band outputs, which correspond to signals received respectively from each of the pair of embedded indoor-facing patch antennas. These reverse-path diplexer output signals are further processed through amplifiers, isolators, and duplexers to be coupled with respective ones of the pair of embedded outdoor-facing patch antennas for transmission, typically to a cellular or mobile phone service provider.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

TERMINOLOGY

PCS refers to Personal Communications Services, which is a generic name for digital mobile voice and/or data services, for example the 1,900 MHz band in North America used for such services.

Forward-path refers to the path from the transceiver of a cellular service, or similar wireless mobile service, provider to a wireless device of a user. That is, forward-path refers to the path from outdoors to indoors, or from, for example, the cellular service provider's base transceiver station to a handset. In embodiments of the present invention, this path includes a portable wireless dual-band repeater module.

Reverse-path refers to the path from a wireless device of a user to the transceiver of a cellular service provider, or a similar wireless mobile service provider. That is, reverse-path refers to the path from indoors to outdoors, or from, for example, the handset to a cellular service provider's base transceiver station. In embodiments of the present invention, this path includes a portable wireless dual-band repeater module.

As used herein, the term diplexer, refers to a device that has one input port for receiving signals from two frequency bands, and that has two output ports for separately providing signals from each of the two frequency bands respectively to other circuits.

As used herein, the term duplexer, refers to a device that isolates a receiver from a transmitter, and enables the receiver/transmitter to share an antenna. More particularly, duplexers used in illustrative embodiments described herein include a common port coupled to an antenna, an output port coupled to provide signals received from the antenna, and an input port to receive signals for transmission and pass those signals to the antenna through the duplexer common port.

Patch antenna refers to an antenna having a patch element and a ground plane.

Various embodiments of the present invention provide a method for creating a wireless repeater by eliminating standalone antennas, coaxial cabling, and separate indoor and outdoor units. Such a wireless repeater in accordance with the present invention includes embedded patch antennas which are integrated with radio frequency filters and amplifiers in a small light-weight module for mounting on a surface, such as the interior surface, of a house or office window, or on the windshield of the vehicle. When mounted on the surface (e.g., interior surface) of the house or office window, one set of embedded patch antennas faces outdoors while another set of embedded patch antennas faces indoors.

Various embodiments of the present invention provide a wireless repeater in a portable module that can be carried and used to overcome poor coverage in a variety of small indoor environments including homes, small offices, hotel rooms, restaurants, coffee shops, retail stores, and so on.

In some embodiments, a portable wireless repeater module having a plurality of embedded bidirectional antennas in accordance with the present invention can be used as a hub to extend coverage in larger indoor areas when mounted at a right angle on a wall such as in a hallway or perpendicular to a ceiling near a doorstep between two rooms.

Various embodiments of the present invention, advantageously provide a wireless repeater in a portable module form factor that can be carried and used to overcome poor signal coverage in a variety of motor vehicles including cars, vans, buses, trucks, etc., when mounted on the interior surface of the vehicle's windshield.

In another aspect of the present invention, portable wireless repeater modules may be used in a tandem arrangement when mounted at right angle to the wall in order to extend wireless coverage for deep indoor penetration.

North American Dual Frequency Bands

Figure 2:
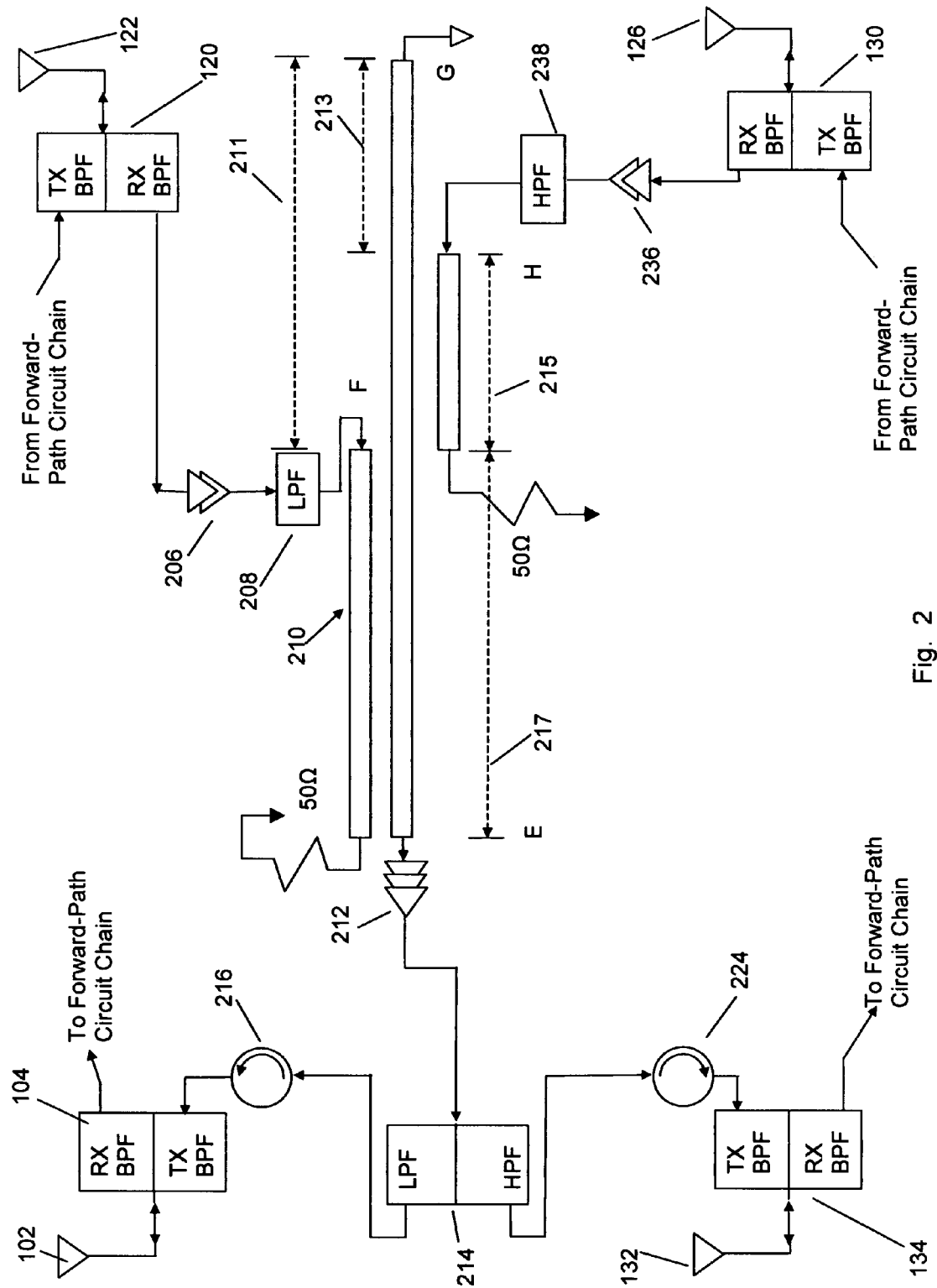
FIG. 2 is a schematic block diagram of the reverse path of a repeater module for North American dual frequency bands in accordance with the present invention.

FIGS. 1 and 2 illustrate the forward and reverse paths of a portable wireless repeater module in accordance with the present invention. The particulars of the relevant electrical characteristics such as, but not limited to, pass band, roll-off and/or cut-off frequencies are discussed in connection with the various elements of the illustrative embodiments.

Figure 10:
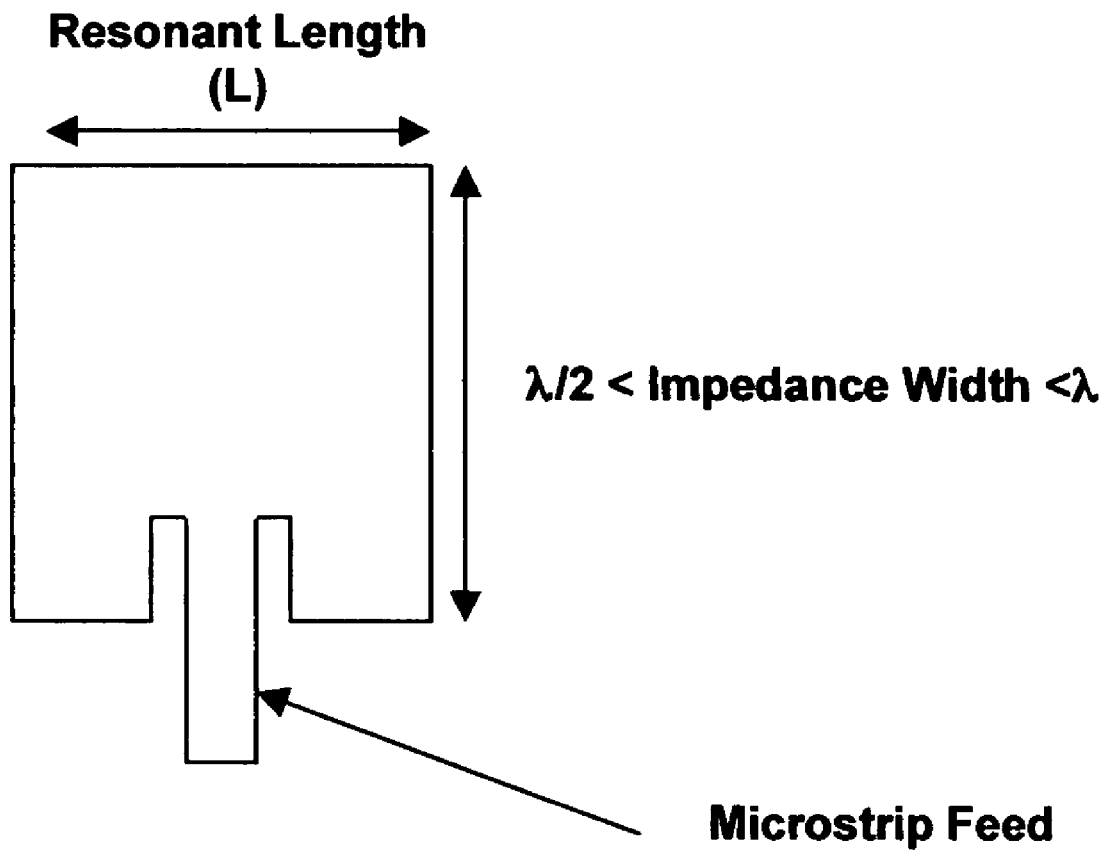
FIG. 10 is a representation of a top-view of a patch antenna and feed line.

Referring to the illustrative embodiment of FIG. 1, in the forward path, i.e., outdoors to indoors, two patch antennas facing outdoors are used. A first patch antenna 102 has a bandwidth of 70 MHz and covers the North American cellular band of 824-894 MHz, and a second patch antenna 132 has a bandwidth of 140 MHz and covers the North American PCS band of 1850-1990 MHz. In various embodiments the patch antennas are of rectangular shape. Each patch antenna is excited in its fundamental mode, and the resonant length is about $\lambda/2$ (half wavelength). To feed the patch antenna, a microstrip transmission line is directly connected to the edge of the patch, this way both the antenna and the feed are on the same substrate. However, by cutting an inset in the patch and connecting the feed line to the patch antenna within the inset (see FIG. 10), the patch and the microstrip line can be matched without additional matching elements. The impedance match is then optimized by properly selecting the depth of the inset. Further, with respect to the patch antenna:

$$L \approx 0.49 \lambda_d = (0.49) \lambda_\circ / (\in_r)^{1/2}$$

Figure 11:
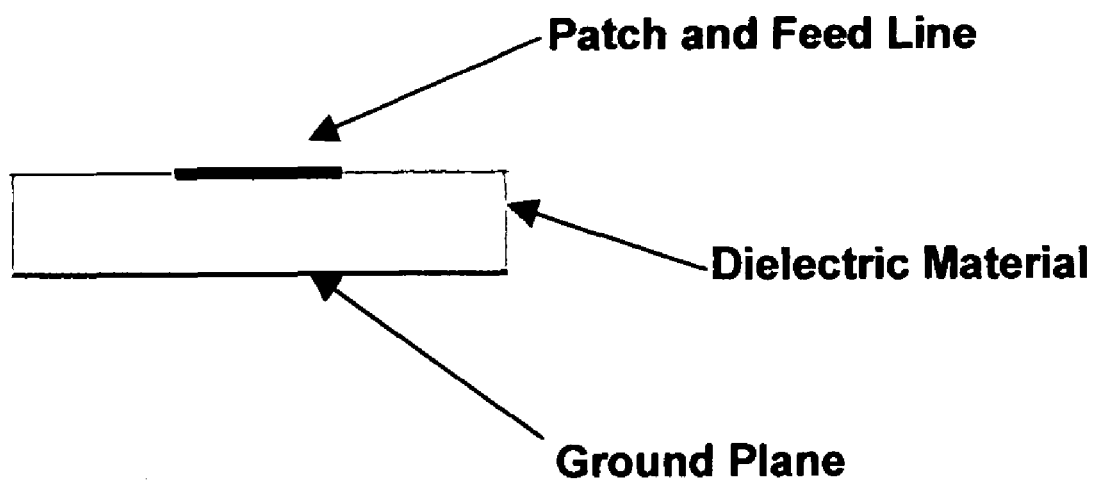
FIG. 11 is a representation of a cross-section of a patch antenna and feed line separated from a ground plane by a dielectric layer.

Where:
L=Resonant Length
$\lambda_d$=Wavelength in PC Board
$\lambda_\circ$=Wavelength in Free Space
$\in_r$=Dielectric Constant of the PC Board Material The patch antennas and their feeds are located on the same surface and separated by a thick dielectric material from the ground plane (see FIG. 11). The thickness of the dielectric material is about 50 mils. The ground plane is approximately 3.5"×3.5" and is undisturbed. No circuitry or any components are mounted on the ground plane below the surface where patch antennas are located.

Still referring to FIG. 1, a schematic block diagram of the forward path of an illustrative embodiment of a dual-band wireless repeater is shown. More particularly, a feed of first patch antenna 102 is coupled to a common port of a first duplexer 104. In operation, first patch antenna 102 is oriented to face outdoors, and is used to receive signals in the 869-894 MHz band. Such signals may be received from, for example, a nearby cellular tower. A receive bandpass filter of duplexer 104 passes the received signal in the 869-894 MHz band and rejects out of band spectrum. The output of the receive filter of duplexer 104 is connected to amplifier gain block 106, which provides moderate gain to the received signal in the 869-894 MHz band. The output of amplifier gain block 106 is coupled to a low pass filter 108, which passes the cellular signals in the 869-894 MHz band while attenuating high frequency leakage above 894 MHz particularly from the adjacent 1900 MHz band circuit disposed in the same housing. The output of low pass filter 108 is coupled to a microstrip element of a dual-band microstrip directional coupler 110 at node C. This microstrip element has a length dimension that is approximately one quarter wavelength at 881 MHz (as indicated by dashed line 117). The microstrip directional couplers provide a means for signal routing and distribution (splitting) and collection (combining) while providing isolation between the frequency bands. The spacing between the lines of the microstrip directional couplers is governed by the coupling factor, thickness of the dielectric substrate, dielectric constant of the substrate (i.e., the board material). The microstrip lines do not necessarily have to be straight lines. These can be bent and meander as long as the spacing between the lines is kept constant and right angles and sharp corners are rounded to avoid formation of high current density regions.

At node C, the signal in the 869-894 MHz band is RF coupled to the main microstrip line of directional coupler 110 and travels toward node D. Node C is located one quarter wavelength, i.e., 90 degrees, at 881 MHz from node A (indicated by the dashed line 111). It is noted that 881 MHz is approximately the midpoint of the passband of the receive filter of duplexer 104. The main microstrip line is short circuited to ground at A. At node C, the signal coupled from low pass filter 108 is presented with an open circuit relative to node A, and therefore will not travel in the direction toward node A. At node D, the signal is delivered to an amplifier chain 112, which, in the illustrative embodiment of FIG. 1, has 70 to 80 dB gain. The amplifiers do not need to be tuned. In the illustrative embodiment, these are off-the-shelf parts that are backed off to ensure they are linear and do not cause distortion of the signal in either path. The output of amplifier chain 112 is coupled to a diplexer 114, which includes a low pass filter and a high pass filter. The low pass filter of diplexer 114 allows signals in the 869-894 MHz band to pass while rejecting higher frequency signals. The high pass filter of diplexer 114 passes signals from 1930 MHz and higher while rejecting frequencies below 1930 MHz. The low pass filter of diplexer 114 passes the amplified signal in the 869-894 MHz band, and that signal is coupled to an isolator 116. Isolator 116 allows signals in the 869-894 MHz band to travel in only one direction, i.e., toward a duplexer 120, while any signals reflected and/or traveling in the opposite direction are terminated in a 50 ohm load. The output of isolator 116 is coupled to a transmit band pass filter of duplexer 120 which passes signals in the 869-894 MHz band. The common port of duplexer 120 is connected to a patch antenna 122, which, in operation, faces indoors. Patch antenna 122 is operable to propagate the signals in the 869-894 MHz band indoors.

A patch antenna 132, oriented to face outdoors in operation, receives signals in the 1930-1990 MHz band from, for example, a nearby cellular tower. The feed of patch antenna 132 is coupled to the common port of a duplexer 134. The receive bandpass filter of duplexer 134 passes the received signal in the 1930-1990 MHz band while rejecting out of band spectrum. The output of the receive bandpass filter of duplexer 134 is connected to an amplifier gain block 136 which provides the received signal in the 1930-1990 MHz band with moderate gain. The output of amplifier gain block 136 is coupled to a high pass filter 138, which passes cellular signals in the 1930-1990 MHz band and attenuates low frequency leakage below 1930 MHz particularly from the adjacent 800 MHz band circuit disposed in the same housing. The output of high pass filter 138 is coupled to dual-band microstrip directional coupler 110 at node B. At node B the signal in the 1930-1990 MHz band is coupled to the main microstrip line of directional coupler 110 and travels toward node D. Node B is located one quarter wavelength, at 1960 MHz from node A (indicated by dashed line 113). At node B, the signal coupled from high pass filter 138 is presented with an open circuit relative to node A and therefore will not travel in the direction toward node A. At node D, the signal is coupled to amplifier chain 112.

Still referring to FIG. 1, the output of amplifier chain 112 is coupled to diplexer 114 which includes a high pass filter that allows signals in the 1930-1990 MHz band and rejects lower frequency signals. The high pass filter of diplexer 114 passes the amplified signal in the 1930-1990 MHz band, and that signal is coupled to isolator 124. Isolator 124 allows signals in the 1930-1990 MHz band to travel in only one direction and toward duplexer 130 and any signals reflected and/or traveling in the opposite direction are terminated in a 50 ohm load. The output of isolator 124 is coupled to the transmit band pass filter of duplexer 130 which passes signals in the 1930-1990 MHz band while rejecting signals outside this band. The common port of duplexer 130 is connected to a patch antenna 126, which, in operation, faces indoors. Patch antenna 126 propagates the signals in the 1930-1990 MHz band to the indoors.

FIG. 2 illustrates the reverse path in an embodiment of the present invention. In the reverse path, i.e., indoors to outdoors, two patch antennas facing indoors are used. Patch antenna 122 has a bandwidth of 45 MHz and covers the North American cellular band of 824-894 MHz, and patch antenna 126 has a bandwidth of 140 MHz and covers North American PCS band of 1850-1990 MHz.

Referring to FIG. 2, indoor-facing patch antenna 122 receives signals in the 824-849 MHz band from wireless products such as cellular phones and/or mobile devices operating indoors. The feed of patch antenna 122 is coupled to the common port of duplexer 120. The receive filter of duplexer 120 passes the received signal in the 824-849 MHz band, and this output is coupled to an amplifier gain block 206, which provides the received signal in the 824-849 MHz band with moderate gain. The output of amplifier gain block 206 is coupled to a low pass filter 208 which passes the cellular signals in the 824-849 MHz band and attenuates high frequency leakage above 849 MHz, particularly from the adjacent 1900 MHz band circuit disposed in the same housing. The output of low pass filter 208 is coupled to a dual-band microstrip directional coupler 210 at node F. At node F the signal in the 824-849 MHz is RF coupled to the main microstrip line of directional coupler 210 and travels toward node E. Node F is located one quarter wavelength at 836 MHz from node G which is short circuited to ground. This quarter wavelength at 836 MHz is illustrated by dashed line 211. At node F, the signal coupled from low pass filter 208 is presented with an open circuit relative to node G, and therefore will not travel in the direction toward node G. At node E, the signal is coupled to an amplifier chain 212 which, in the illustrative embodiment, has 70 to 80 dB gain. The output of amplifier chain 212 is coupled to diplexer 214 which includes a low pass filter and a high pass filter. The low pass filter of diplexer 214 allows the signal in the 824-849 MHz band and rejects higher frequency signals. The high pass filter of diplexer 214 passes signals from 1850 MHz and higher and rejects frequencies below 1850 MHz. The output of low pass filter of diplexer 214 is coupled to an isolator 216. Isolator 216 allows signals in the 824-849 MHz band to travel in only one direction and toward duplexer 104 and any signals reflected and/or traveling in the opposite direction are terminated in a 50 ohm load. The output of isolator 216 is coupled to the transmit band pass filter of duplexer 104 the passband of which is the 824-849 MHz band. The common port of duplexer 104 is coupled to patch antenna 102, which in operation faces outdoors. In the illustrative embodiment, patch antenna 102 propagates the signals in the 824-849 MHz band outdoors toward, for example, a nearby cellular tower.

Still referring to FIG. 2, patch antenna 126 receives signals in the 1850-1910 MHz band from cellular phones and/or mobile devices operating indoors. The feed of patch antenna 126 is coupled to the common port of duplexer 130. The receive filter of duplexer 130 passes the received signal in the 1850-1910 MHz band, and this output is coupled to an amplifier gain block 236, which provides the received signal in the 1850-1910 MHz band with moderate gain. The output of amplifier gain block 236 is coupled to a high pass filter 238 which passes the cellular signals in the 1850-1910 MHz band and attenuates low frequency leakage below 1850 MHz, particularly from the adjacent 800 MHz band circuit disposed in the same housing. The output of high pass filter 238 is coupled to dual-band microstrip directional coupler 210 at node H. At node H, the signal in the 1850-1910 MHz band is RF coupled to the main microstrip line of directional coupler 210 and travels toward node E. Node H is located one quarter wavelength at 1880 MHz from node G which is short circuited to ground. At node H, the signal coupled from high pass filter 238 is presented with an open circuit relative to node G and therefore will not travel in the direction toward node G. At node E, the signal is coupled to amplifier chain 212, the output of which is coupled to diplexer 214. The high pass filter of diplexer 214 allows the signal in the 1850-1910 MHz band while rejecting undesired lower frequency signals. The low pass filter of diplexer 214 passes signals up to 849 MHz and rejects frequencies above 849 MHz. The high pass filter of diplexer 214 passes the amplified signal in the 1850-1910 MHz band to isolator 224. Isolator 224 allows signals in the 1850-1910 MHz band to travel in only one direction, i.e., toward duplexer 134. Any signals reflected and/or traveling in the opposite direction are terminated in a 50 ohm load. The output of isolator 224 is coupled to the transmit bandpass filter of duplexer 134 which passes signals in the 1850-1910 MHz passband. The common port of duplexer 134 is coupled to patch antenna 132. Patch antenna 132 propagates the signals in the 1850-1910 MHz band outdoors toward, for example, a nearby cellular tower.

European and International Dual Frequency Bands

Figure 3:
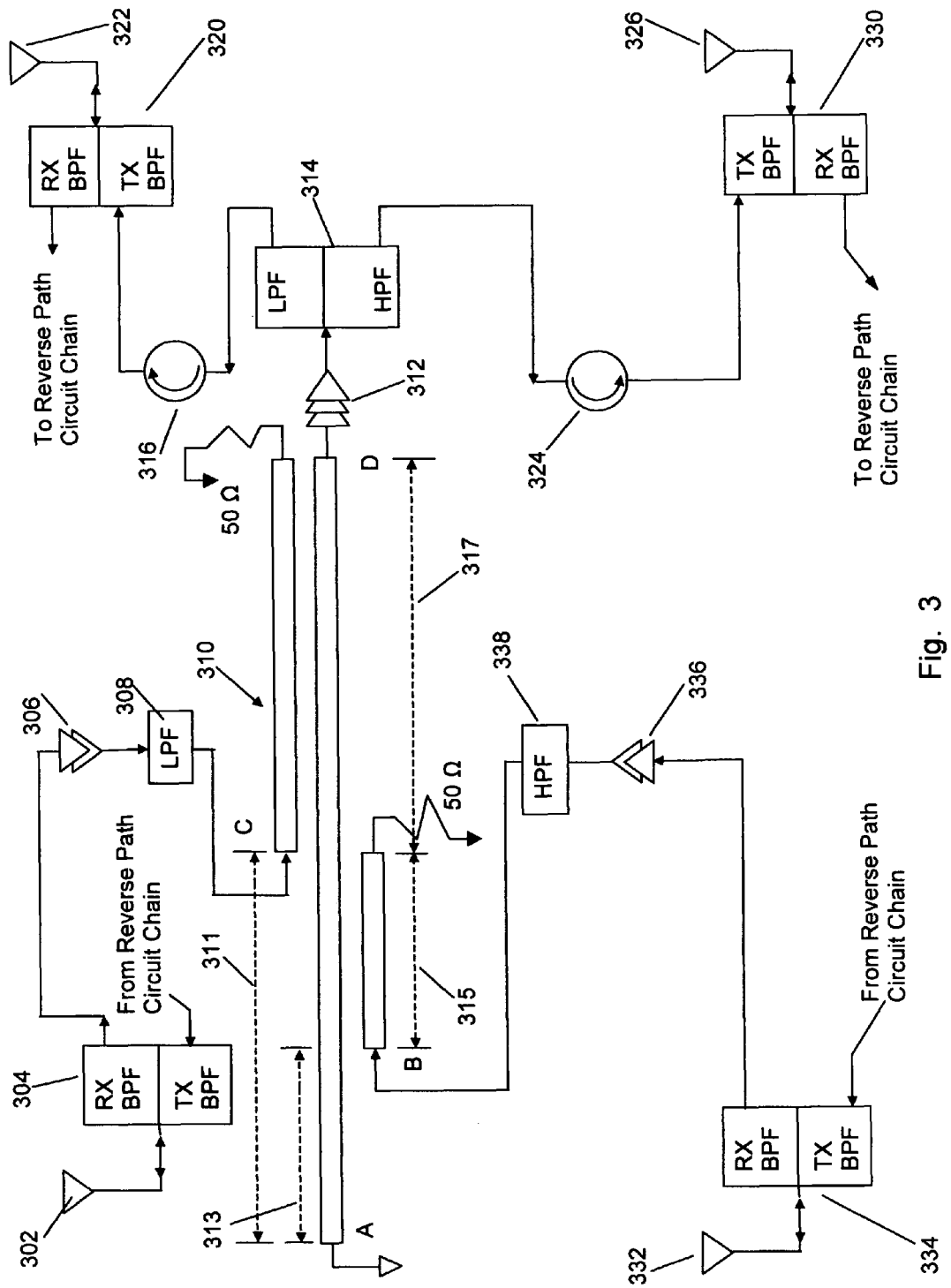
FIG. 3 is a schematic block diagram of the forward path of a repeater module for European and International dual frequency bands in accordance with the present invention, which is similar to FIG. 1, but which handles different frequency bands.
Figure 4:
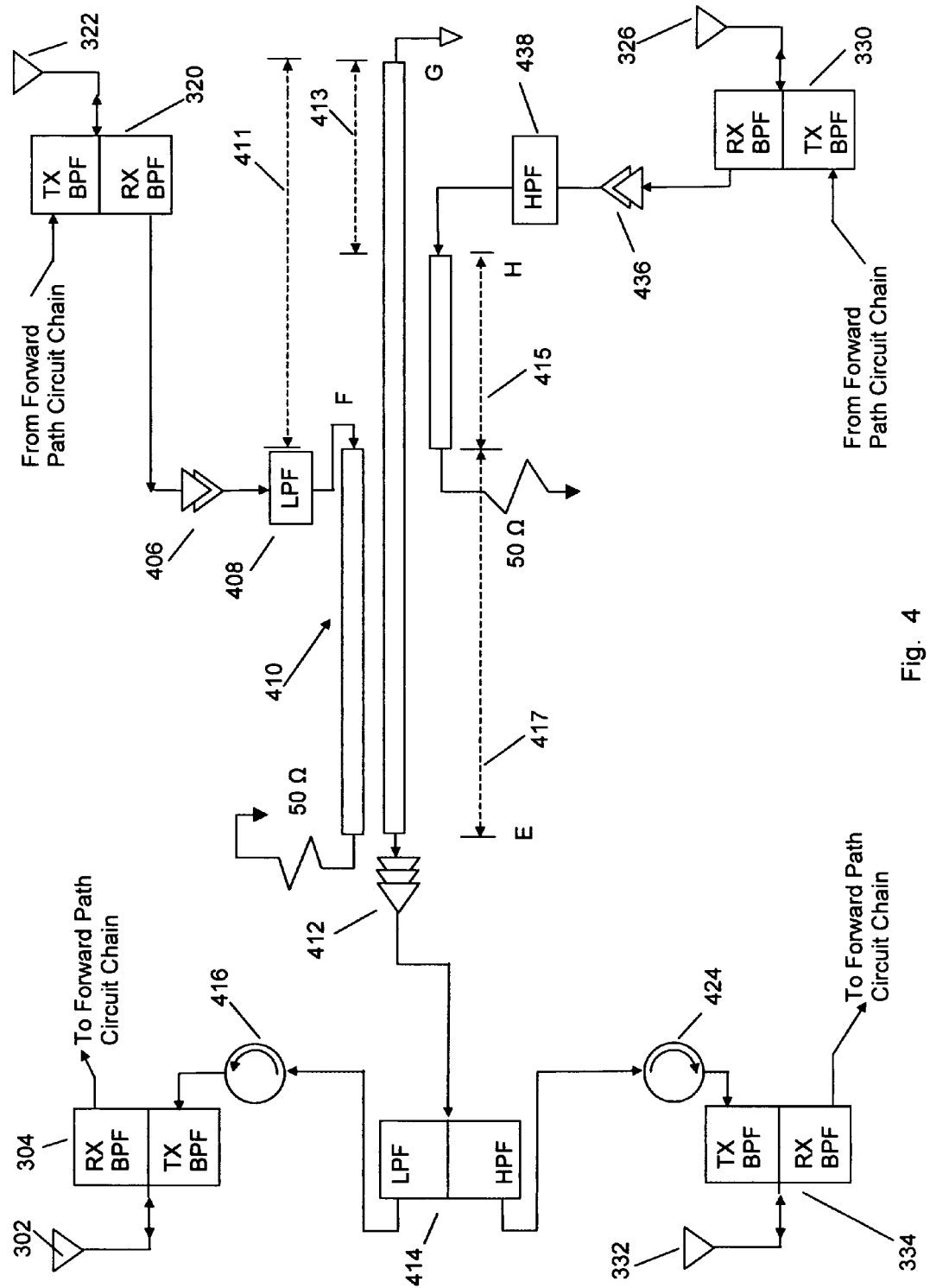
FIG. 4 is a schematic block diagram of the forward path of a repeater module for European and International dual frequency bands in accordance with the present invention, which is similar to FIG. 2, but which handles different frequency bands.

FIGS. 3 and 4 illustrate the forward and reverse paths of a portable wireless repeater module in accordance with the present invention. As can be seen, the wireless repeater module of FIGS. 3 and 4 is architecturally congruent with the wireless repeater module of FIGS. 1 and 2. In each case the portable dual-band wireless repeater module is disposed in a housing. However, the illustrative portable wireless repeater modules of FIGS. 1-2 and FIGS. 3-4 respectively process signals in different frequency bands. Those skilled in the art and having the benefit of this disclosure will recognize the various modifications in the filters, isolators, couplers, amplifiers, and so on, that are needed to process the signals North American frequency bands versus the European and International frequency bands. The particulars of the relevant electrical characteristics such as, but not limited to, pass band, roll-off and/or cut-off frequencies are discussed in connection with the various elements of the different illustrative embodiments.

Referring to the illustrative embodiment of FIG. 3, in the forward path, i.e., outdoors to indoors, a pair of patch antennas, which in operation face outdoors, and a pair of patch antennas, which in operation face indoors are used. A first outdoor-facing patch antenna 302 has a bandwidth of 80 MHz and covers the European and international cellular band of 880-960 MHz, and a second outdoor-facing patch antenna 332 has a bandwidth of 170 MHz and covers the European and Intentional DCS band of 1710-1880 MHz.

Still referring to FIG. 3, patch antenna 302 receives signals in the 925-960 MHz band from, for example, a nearby cellular tower. The feed of patch antenna 302 is coupled to the common port of a duplexer 304, and the receive filter of duplexer 304 passes the received signal in the 925-960 MHz band while rejecting out of band spectrum. The output of the receive filter of duplexer 304 is coupled to an amplifier gain block 306, which provides the received signal in the 925-960 MHz band with moderate gain. The output of amplifier gain block 306 is coupled to a low pass filter 308 which passes signals, for example cellular signals, in the 925-960 MHz band and attenuates high frequency leakage above 960 MHz particularly from the adjacent 1800 MHz band circuit in the illustrative dual-band wireless repeater module of the present invention. The output of low pass filter 308 is coupled to a dual-band microstrip directional coupler 310 at node C. At node C, the signal in the 925-960 MHz band is RF coupled to the main microstrip line of directional coupler 310 and travels toward node D. Node C is located one quarter wavelength at 942 MHz from node A which is short circuited to ground. This one quarter wavelength distance is represented by dashed line 311. At node C, the signal coupled from low pass filter 308 is presented with an open circuit relative to node A, and therefore will not travel in the direction toward node A. At node D, the signal is delivered to an amplifier chain 312 which, in this illustrative embodiment, has 70 to 80 dB gain. The output of amplifier chain 312 is coupled to a diplexer 314, which includes a low pass filter and a high pass filter. The low pass filter of diplexer 314 allows the signal in the 925-960 MHz band pass while rejecting higher frequency signals. The high pass filter of diplexer 314 passes signals from 1805 MHz and higher while rejecting frequencies below 1805 MHz. The low pass filter of diplexer 314 passes the amplified signal in the 925-960 MHz band, and this signal is coupled to an isolator 316. Isolator 316 allows signals in the 925-960 MHz band to travel in only one direction, i.e., toward a duplexer 320, and any signals reflected and/or traveling in the opposite direction are terminated in a 50 ohm load. The output of isolator 316 is coupled to the transmit band pass filter of duplexer 320 which passes signals in the 925-960 MHz passband. The common port of duplexer 320 is connected to an indoor-facing patch antenna 322 which propagates signals in the 925-960 MHz band.

Still referring to FIG. 3, outdoor-facing patch antenna 332 receives signals in the 1805-1880 MHz band from, for example, a nearby cellular tower. The feed of patch antenna 332 is coupled to the common port of a duplexer 334. The receive filter of duplexer 334 passes the received signal in the 1805-1880 MHz band and rejects out of band spectrum. The output of the receive filter of duplexer 334 is coupled to an amplifier gain block 336 which provides the received signal with moderate gain. The output of amplifier gain block 336 is coupled to a high pass filter 338 which passes the signals in the 1805-1880 MHz band, and attenuates lower frequency leakage below 1805 MHz, particularly from the 900 MHz band circuit disposed within the same housing. The output of high pass filter 338 is coupled to dual-band microstrip directional coupler 310 at node B. At node B, the signal in the 1805-1880 MHz band is RF coupled to the main microstrip line of directional coupler 310 and travels toward node D. Node B is located one quarter wavelength at 1842 MHz from node A which is short circuited to ground. At node B the signal coupled from the high pass filter 338 is presented with an open circuit relative to node A, and therefore will not travel in the direction toward node A. At node D, the signal is delivered to amplifier chain 312. The output of amplifier chain 312 is coupled to diplexer 314 which includes a low pass filter and a high pass filter. The high pass filter of diplexer 314 passes the signal in the 1805-1880 MHz band while rejecting lower frequency signals. The low pass filter of diplexer 314 passes signals from 925-960 MHz while rejecting frequencies above 960 MHz. The output of the high pass filter of diplexer 314 is coupled to an isolator 324. Isolator 324 allows signals in the 1805-1880 MHz band to travel in only one direction, i.e., toward duplexer 330 and any signals reflected and/or traveling in the opposite direction are terminated in a 50 ohm load. The output of isolator 324 is delivered to the transmit band pass filter of duplexer 330 which passes signals in the 1805-1880 MHz band. The common port of duplexer 330 is coupled to indoor-facing patch antenna 326. Indoor-facing patch antenna 326 propagates the signals in the 1805-1880 MHz band.

In the reverse path, i.e., indoors to outdoors, two patch antennas facing indoors are used, the first patch antenna has a bandwidth of 80 MHz and covers the European and International cellular band of 880-960 MHz, the second patch antenna has a bandwidth of 170 MHz and covers the European and the International DCS band of 1710-1880 MHz.

Referring to FIG. 4, an indoor-facing patch antenna 322 receives signals in the 880-915 MHz band from cellular phones and/or mobile devices operating indoors. The feed of patch antenna 322 is coupled to the common port of duplexer 320. The receive filter of duplexer 320 passes the received signal which is coupled to an amplifier gain block 406. Amplifier gain block 406 provides the received signal in the 880-915 MHz band with moderate gain. The output of amplifier gain block 406 is coupled to a low pass filter 408 which passes the signals in the 880-915 MHz band and attenuates high frequency leakage above 915 MHz, particularly from the adjacent 1800 MHz band circuit that is disposed in the same housing. The output of low pass filter 408 is coupled to dual-band microstrip directional coupler 410 at node F. At node F, the signal from low pass filter 408 is RF coupled to the main microstrip line of directional coupler 410 and travels toward node E. Node F is located one quarter wavelength at 897 MHz from node G which is short circuited to ground. At node F, the signal is presented with an open circuit relative to node G, and therefore will not travel in the direction toward node G. At node E, the signal is coupled to amplifier chain 412. The output of amplifier chain 412 is coupled to diplexer 414. The low pass filter of diplexer 414 allows the signal in the 880-915 MHz band and rejects high frequency signals. The high pass filter of diplexer 414 passes signals from 1710 Hz and higher while rejecting frequencies below 1710 MHz. The output of the low pass filter of diplexer 414 is coupled to isolator 416. Isolator 416 allows signals in the 880-915 MHz band to travel in only one direction, i.e., toward duplexer 304 and any signals reflected and/or traveling in the opposite direction are terminated in a 50 ohm load. The output of isolator 416 is coupled to the transmit band pass filter of duplexer 304 which passes the signals in the 880-915 MHz band. The common port of duplexer 304 is connected to outdoor-facing patch antenna 302. Patch antenna 302 propagates the signals in the 880-915 MHz band outdoors toward, for example, a nearby cellular tower.

Still referring to FIG. 4, indoor-facing patch antenna 326 receives signals in the 1710-1785 MHz band from, for example, cellular phones and/or mobile devices operating indoors. The feed of patch antenna 326 is connected to the common port of duplexer 330. The receive filter of duplexer 330 passes the received signal in the 1710-1785 MHz band, and that output signal is coupled to an amplifier gain block 436 which provides that signal with moderate gain. The output of amplifier gain block 436 is coupled to a high pass filter 438 which passes the signals in the 1710-1785 MHz band and attenuates lower frequency leakage below 1710 MHz, particularly from the adjacent 900 MHz band circuit disposed in the same housing. The output of high pass filter 438 is coupled to dual-band microstrip directional coupler 410 at node H. At node H, the signal in the 1710-1785 MHz is RF coupled to the main microstrip line of directional coupler 410 and travels toward node E. Node H is located one quarter wavelength at 1747 MHz from node G. At node H, the signal from high pass filter 438 is presented with an open circuit relative to node G and therefore will not travel in the direction toward node G. At node E, the signal is coupled to amplifier chain 412. The output of amplifier chain 412 is coupled to diplexer 414. The high pass filter of diplexer 414 passes the amplified signal in the 1710-1785 MHz band which is coupled to isolator 424. Isolator 424 allows signals in the 1710-1785 MHz band to travel in only one direction, i.e., toward duplexer 414 and any signals reflected and/or traveling in the opposite direction are terminated in a 50 ohm load. The output of isolator 424 is coupled to the transmit band pass filter of duplexer 414, which passes signals in the 1710-1785 MHz band. The common port of duplexer 414 is connected to outdoor-facing patch antenna 332. Patch antenna 332 propagates the signals in the 1710-1785 MHz band outdoors toward, for example, a nearby cellular tower.

Figure 5:
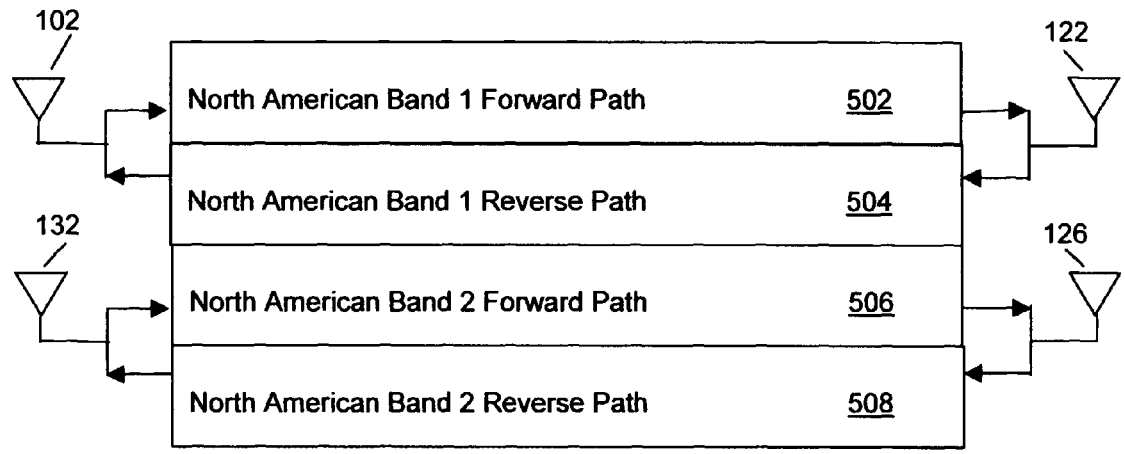
FIG. 5 is a block diagram of an illustrative embodiment of the present invention for the North American dual frequency bands, showing a set of outdoor-facing patch antennas, a set of indoor-facing patch antennas, and the connection relationship of the patch antennas to the forward and reverse paths.
Figure 6:
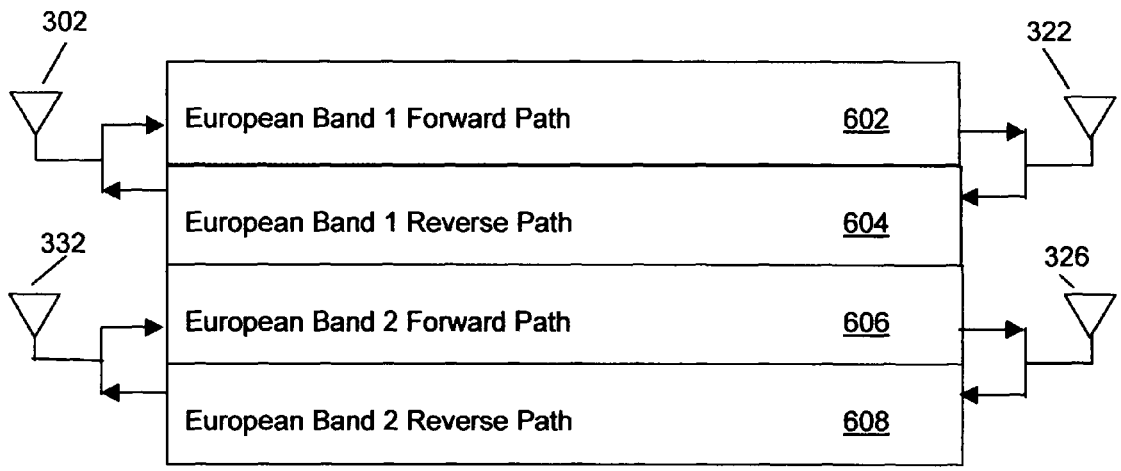
FIG. 6 is a block diagram of an illustrative embodiment of the present invention for the European and International dual frequency bands, showing a set of outdoor-facing patch antennas, a set of indoor-facing patch antennas, and the connection relationship of the patch antennas to the forward and reverse paths.

FIGS. 5 and 6 are block diagrams of illustrative embodiments of the present invention for, respectively, the North American dual frequency bands and the European and International dual frequency bands, showing a set of outdoor-facing patch antennas, a set of indoor-facing patch antennas, and the connection relationship of the patch antennas to the forward and reverse paths.

Referring to FIG. 5, a dual-band repeater module in accordance with the present invention is illustrated in block diagram form. As shown in FIG. 5, there is a forward path 502 and a reverse path 504 for a first frequency band, and a forward path 506 and a reverse path 508 for a second frequency band. In this embodiment the first frequency band covers the North American cellular band, and the second frequency band covers the North American PCS band. A first outdoor-facing patch antenna 102 is coupled to both forward path 502 and reverse path 504. In this illustrative embodiment, patch antenna 102 is used to receive signals originating from a cellular service provider's base transceiver station, and is also used to transmit signals, typically originating from a handset, back to the base transceiver station. A second outdoor-facing patch antenna 132 is coupled to both forward path 506 and reverse path 508. Patch antenna 132 is used to receive signals originating from a cellular service provider's base transceiver station, and is also used to transmit signals, typically originating from a handset, back to the base transceiver station. A first indoor-facing patch antenna 122 is coupled to both forward path 502 and reverse path 504. In this illustrative embodiment, patch antenna 122 is used to transmit signals, typically originating from a cellular service provider's base transceiver station, to a handset, and is also used to receive signals, typically originating from a handset. A second indoor-facing patch antenna 126 is coupled to both forward path 506 and reverse path 508. In this illustrative embodiment, patch antenna 126 is used to transmit signals, typically originating from a cellular service provider's base transceiver station, to a handset, and is also used to receive signals, typically originating from a handset.

Referring to FIG. 6, another dual-band repeater module in accordance with the present invention is illustrated in block diagram form. FIG. 6 is architecturally identical to FIG. 5, but has components, such as but not limited to, antennas, filters, amplifiers, and directional couplers, that are designed to operate with the European and International frequency bands.

Figure 7:
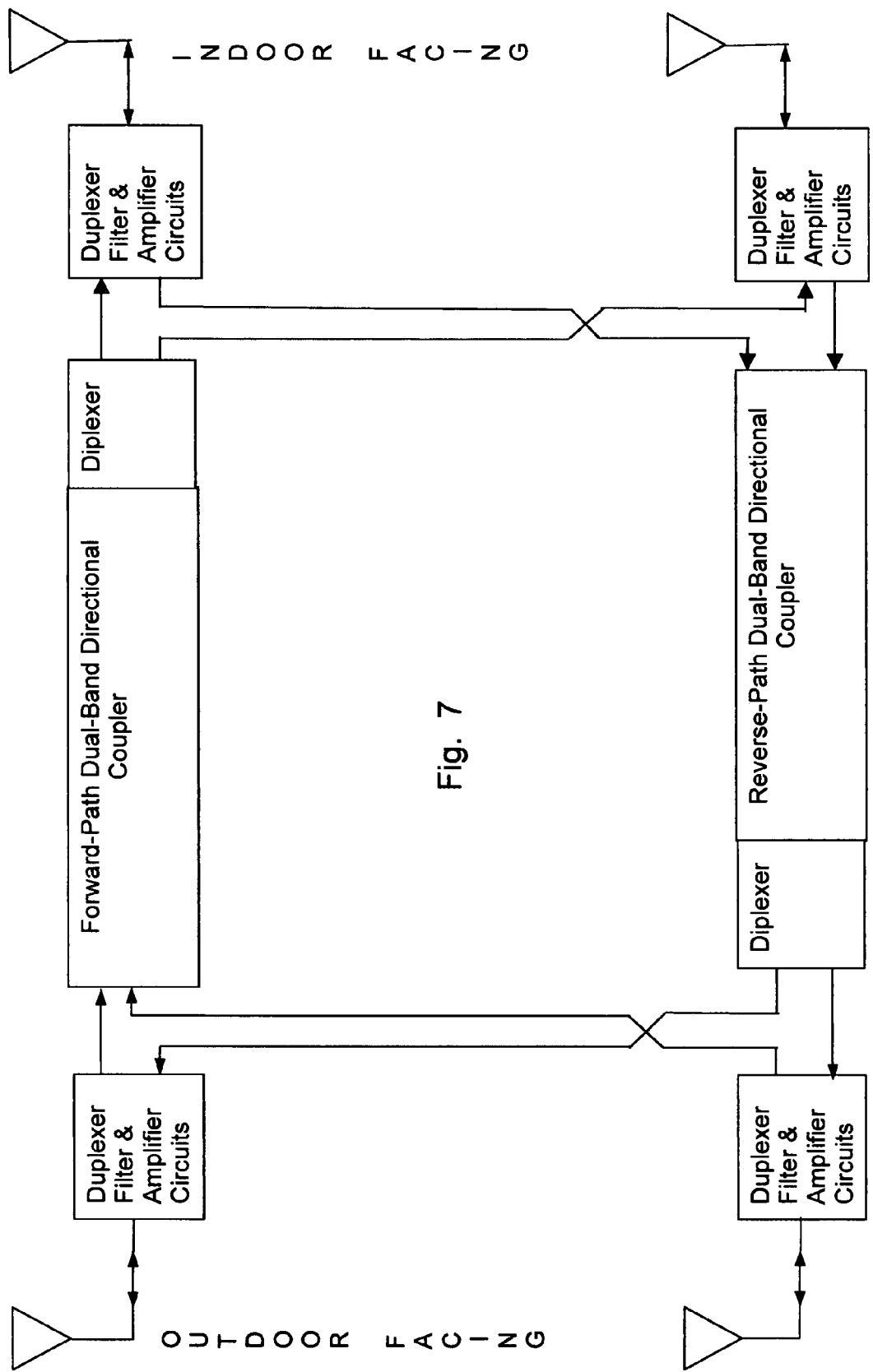
FIG. 7 is a block diagram of an illustrative embodiment of the present invention, showing the architectural relationship between the embedded outdoor-facing patch antennas, the embedded indoor-facing patch antennas, the forward path of the wireless repeater module including the forward path dual band directional coupler, and the reverse path of the wireless repeater module including the reverse path dual band directional coupler.

FIG. 7 is a block diagram of an illustrative embodiment of the present invention, showing the architectural relationship between the embedded outdoor-facing patch antennas, the embedded indoor-facing patch antennas, the forward path of the wireless repeater module including the forward-path dual-band directional coupler, and the reverse-path of the wireless repeater module including the reverse-path dual-band directional coupler.

Figure 8:
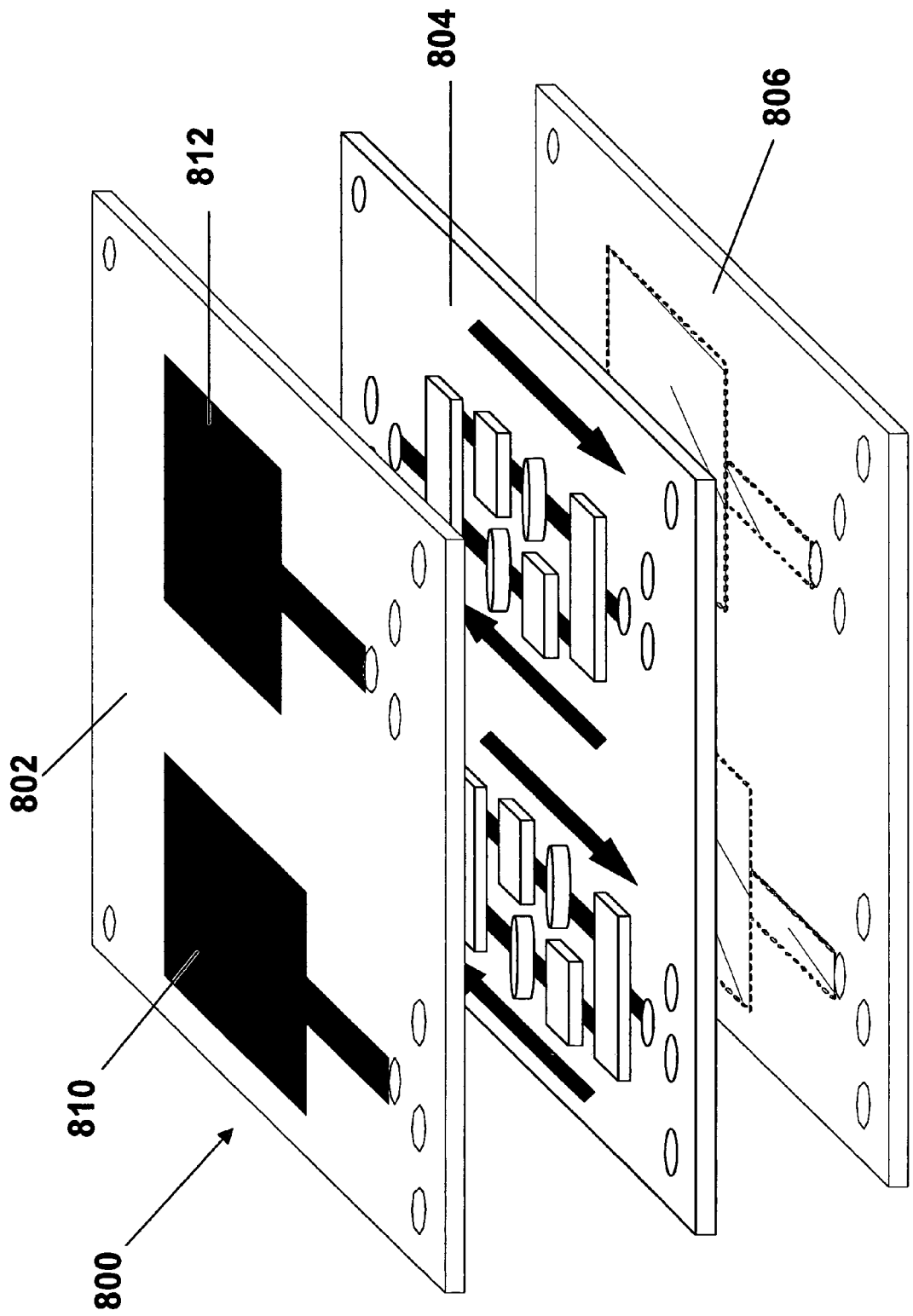
FIG. 8 is an exploded isometric view of an illustrative embodiment of the present invention showing a first antenna board having a pair of outdoor-facing patch antennas, a circuit board with various active and passive components, and a second antenna board having a pair of indoor-facing patch antennas.
Figure 9:
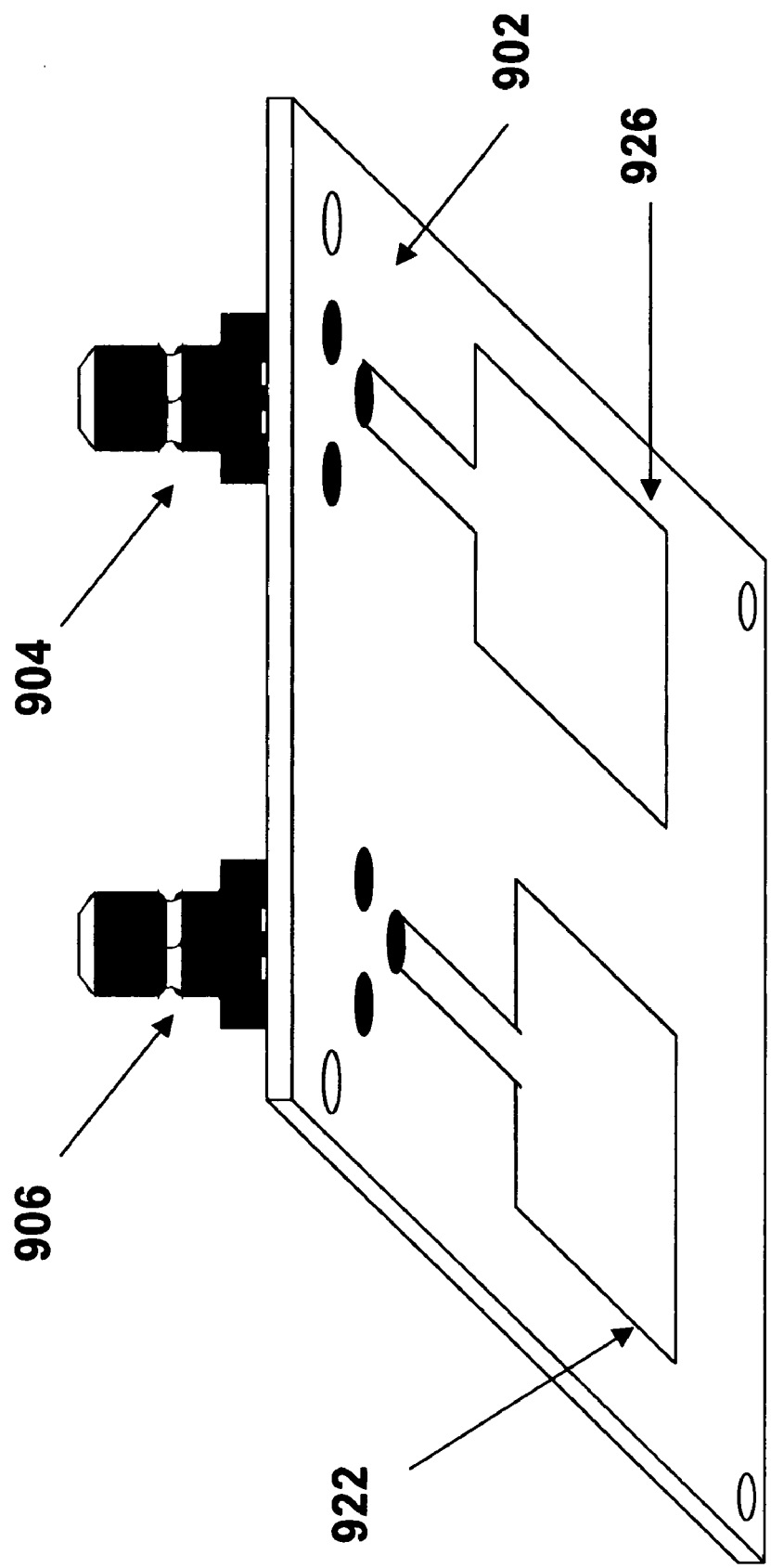
FIG. 9 is an isometric view of an antenna board having a pair of indoor-facing patch antennas.

FIGS. 8 and 9 show the printed circuit boards of an exemplary embodiment of the present invention. FIG. 8 shows a central board having the components of the transceivers, except for the patch antennas, disposed thereon. A first one of the outer boards of FIG. 8 include the outdoor-facing patch antennas, and a second one of the outer boards includes the indoor-facing patch antennas.

Repeater Design and Implementation

Various embodiments of the present invention provide a repeater module including three layers of printed circuit boards housed in a durable impact-resistant molded plastic casing, or housing. The plastic casing, or housing, (not shown in the figures) can be provided in a variety of colors. The outer layers contain the antennas and female subminiature snap-on connectors. The subminiature connector is placed on the bottom surface where the ground plane is located, but a small clearance is provided around the connector in order to avoid disturbing ground continuity. The center pin of the subminiature connector is brought up to the top surface through a hole in the substrate where the center pin is then soldered to the microstrip feed line. The subminiature connector is of female type and snaps into its male counterpart that resides on the middle printed circuit board, which is connected to the duplexer. In alternative embodiments the subminiature connector may be replaced with a small piece of semi-rigid coaxial cable for cost savings. The concept and the connection arrangement remain the same.

In order to provide a reasonably good impedance match between the antenna and the microstrip feed line on one hand, and the microstrip feed line and the subminiature connector (or a section of coaxial line as a possible low cost substitute for subminiature connector) on the other hand, the characteristic impedance of the microstrip feed line is designed for and is kept as close as possible to 50 ohms.

Still referring to the repeater module, the inner, or middle, layer contains the radio frequency conditioning devices including filters/duplexers, amplifiers as well as isolators and an optional battery pack, which may be of the rechargeable type. In typical embodiments, the casing of the repeater module has an adhesive-backed material which allows the repeater to be easily installed on the interior surface of a glass window or a vehicle's windshield or rear window. Various embodiments of the present invention provide a repeater module that comes with two types of plastic receptacles (holders): (1) a lateral receptacle for tangential installation on a glass window for outdoor/indoor wireless communications; and (2) a vertical receptacle for upright (i.e., right angle) installation when the repeater is used for tandem network connection to extend indoor coverage for deep indoor signal penetration and wireless coverage.

The above descriptions of various embodiments are illustrative of the present invention. Those skilled in the art and having the benefit of this disclosure will recognize that alternative embodiments of the present invention may be constructed wherein, for example, different frequency bands may be used, or a different number of frequency bands may be used. In further alternatives, a single repeater module can be equipped to provide service for both the North American dual frequency bands, and the European and International dual frequency bands. The present invention is not limited to processing signals from the specific frequency bands used in describing the illustrative embodiments herein.

CONCLUSION

An advantage of some embodiments of the present invention is providing a low-cost, easy to install, dual band wireless repeater module.

An advantage of some embodiments is the portability of wireless repeaters in accordance with the present invention.

Various embodiments of the present invention find application in homes, small offices, and other locations where portability of a wireless repeater is desirable.

It is noted that portable wireless repeater modules in accordance with the present invention may also be implemented for different frequency bands so that alternative applications such as WiMax, Wi-Fi, Digital Cordless Telephone, and others may be provided with service area extensions.

It is to be understood that the present invention is not limited to the embodiments described above, but encompasses any and all embodiments within the scope of the subjoined Claims and their equivalents.

What is claimed is:

1. A repeater module for wireless communication, comprising:

a housing;
a first outdoor-facing patch antenna coupled to a first forward-path dual-band directional coupler;
a second outdoor-facing patch antenna coupled to the first forward-path dual-band directional coupler;
a first indoor-facing patch antenna coupled to a first reverse-path dual-band directional coupler; and
a second indoor-facing patch antenna coupled to the first reverse-path dual-band directional coupler;
wherein an output terminal of the first forward-path dual-band directional coupler is coupled to the first and second indoor-facing patch antennas; and an output terminal of the first reverse-path dual-band directional coupler is coupled to the first and second outdoor-facing patch antennas;
wherein the first outdoor-facing patch antenna and the second outdoor-facing patch antenna are disposed on a first surface of a first printed circuit board: the first forward-path dual-band directional coupler and the first reverse-path dual-band directional coupler are disposed on a second printed circuit board: the first indoor-facing patch antenna and the second indoor-facing patch antenna are disposed on a first surface of a third printed circuit board and the first, second and third printed circuit boards are disposed within the housing such that the first surface of each of the first and third printed circuit boards are facing away from the second printed circuit board.

2. The repeater module of claim 1, further comprising:
a first duplexer having a receive bandpass filter and a transmit bandpass filter, the receive bandpass filter coupled to an input terminal of a first gain block; a first low-pass filter having an input terminal coupled to an output terminal of the first gain block, and the first low-pass filter having an output terminal;
wherein the first duplexer, the first gain block and the first low-pass filter are disposed in a path between the first outdoor-facing patch antenna and a first terminal of the first forward-path dual-band directional coupler.

3. The repeater module of claim 2, wherein the first forward-path dual-band directional coupler comprises a first microstrip element having a length substantially equal to one-quarter of a wavelength of a first frequency, a second microstrip element having a length substantially equal to one-quarter of a wavelength of a second frequency, and a main microstrip element disposed between the first and second microstrip elements;
wherein a first end of the main microstrip element is connected to ground, and a second end of the main microstrip element is coupled to an input terminal of a first amplifier gain block.

4. The repeater module of claim 3, wherein the first microstrip element is positioned relative to the main microstrip element such that a first end of the first microstrip element is disposed a distance from the first end of the main microstrip element, the distance being substantially equal to one-quarter of a wavelength of the first frequency.

5. The repeater module of claim 4, wherein the first frequency is approximately equal to the midpoint of the passband of the receive bandpass filter of the first duplexer.

6. The repeater module of claim 3, further comprising:
a second duplexer having a receive bandpass filter and a transmit bandpass filter, the receive bandpass filter coupled to an input terminal of a second gain block; a first high-pass filter having an input terminal coupled to an output terminal of the first gain block, and the first high-pass filter having an output terminal;
wherein the second duplexer, the second gain block and the first high-pass filter are disposed in a path between the second outdoor-facing patch antenna and a second terminal of the first forward-path dual-band directional coupler.

7. The repeater module of claim 6, wherein the second microstrip element is positioned relative to the main microstrip element such that a first end of the second microstrip element is disposed a distance from the first end of the main microstrip element, the distance being substantially equal to one-quarter of a wavelength of the second frequency.

8. The repeater module of claim 7, wherein the second frequency is approximately equal to the midpoint of the passband of the receive bandpass filter of the second duplexer.

9. The repeater module of claim 6, wherein the passband of the receive bandpass filter of the first duplexer is 925 MHz to 960 MHz, and the passband of the receive bandpass filter of the second duplexer is 1805 MHz to 1880 MHz.

10. The repeater module of claim 6, wherein the passband of the receive bandpass filter of the first duplexer is 869 MHz to 894 MHz, and the passband of the receive bandpass filter of the second duplexer is 1930 MHz to 1990 MHz.

11. A repeater module for wireless communication, comprising:
a housing;
a first patch antenna, the first patch antenna having a feed terminal;
a first duplexer, the first duplexer having a first common port and a first receive bandpass filter output terminal, the first common port coupled to the feed terminal of the first patch antenna;
a first amplifier gain block having an input terminal and an output terminal, the input terminal of the first amplifier gain block coupled to the first receive filter output terminal;
a first low-pass filter having an input terminal and an output terminal, the input terminal coupled to the output terminal of the first amplifier gain block;
a first forward-path dual-band directional coupler coupled to the output terminal of the first low-pass terminal;
a second patch antenna, the second patch antenna having a feed terminal;
a second duplexer, the second duplexer having a second common port and a second receive filter output terminal, the second common port coupled to the feed of the second patch antenna;
a second amplifier gain block having an input terminal and an output terminal, the input terminal of the second amplifier gain block coupled to the second receive filter output terminal; and
a first high-pass filter having an input terminal and an output terminal, the input terminal coupled to the output terminal of the second amplifier gain block, the output terminal of the first high-pass filter coupled to the first forward-path dual-band directional coupler;
wherein the first patch antenna and the second patch antenna are disposed on a first surface of a first printed circuit board, the first duplexer, the second duplexer, the first amplifier gain block, the second amplifier gain block, the first low-pass filter, the first high-pass filter, the first forward-path dual-band directional coupler, the first amplifier chain, the first diplexer, the first isolator, the second isolator, the third duplexer, and the fourth duplexer are disposed on a second printed circuit board, and the third patch antenna and the fourth patch antenna are disposed on first surface of a third printed circuit board, and the first, second and third printed circuit boards are disposed within the housing such that the first surface of each of the first and third printed circuit boards are facing away from the second printed circuit board.

12. The repeater module of claim 11, wherein the second printed circuit board is disposed between the first and third printed circuit boards.

13. The repeater module of claim 12, wherein a feed line of the first patch antenna is coupled to the first duplexer through a first subminiature snap-on connector, a feed line of the second patch antenna is coupled to the second duplexer through a second subminiature snap-on connector, a feed line of the third patch antenna is coupled to the third duplexer through a third subminiature snap-on connector, and a feed line of the fourth patch antenna is coupled to the fourth duplexer through a fourth subminiature snap-on connector.

14. The repeater module of claim 13, further comprising a rechargeable battery pack disposed within the housing.

15. The repeater module of claim 13, further comprising a means for removably attaching the housing to a surface of a window.

16. A method of extending an area in which cellular telephones are operable, comprising:
attaching a housing to a surface of a window, the housing having disposed therein:
a first patch antenna, the first patch antenna having a feed terminal;
a first duplexer, the first duplexer having a first common port and a first receive bandpass filter output terminal, the first common port coupled to the feed terminal of the first patch antenna;
a first amplifier gain block having an input terminal and an output terminal, the input terminal of the first amplifier gain block coupled to the first receive bandpass filter output terminal;
a first low-pass filter having an input terminal and an output terminal, the input terminal coupled to the output terminal of the first amplifier gain block;
a first forward-path dual-band directional coupler coupled to the output terminal of the first low-pass terminal;
a second patch antenna, the second patch antenna having a feed terminal;
a second duplexer, the second duplexer having a second common port and a second receive bandpass filter output terminal, the second common port coupled to the feed of the second patch antenna;
a second amplifier gain block having an input terminal and an output terminal, the input terminal of the second amplifier gain block coupled to the second receive bandpass filter output terminal; and
a first high-pass filter having an input terminal and an output terminal, the input terminal coupled to the output terminal of the second amplifier gain block, the output terminal of the first high-pass filter coupled to the first forward-path dual-band directional coupler.

17. The method of claim 16, wherein the first patch antenna and the second patch antenna are disposed on a first surface of a first printed circuit board, the first duplexer, the second duplexer, the first amplifier gain block, the second amplifier gain block, the first low-pass filter, the first high-pass filter, the first forward-path dual-band directional coupler, the first amplifier chain, the first diplexer, the first isolator, the second isolator, the third duplexer, and the fourth duplexer are disposed on a second printed circuit board, and the third patch antenna and the fourth patch antenna are disposed on first surface of a third printed circuit board, and the first, second and third printed circuit boards are disposed within the housing such that the first surface of each of the first and third printed circuit boards are facing away from the second printed circuit board.

* * * * *